W. S. HARLEY.
TRANSMISSION GEAR.
APPLICATION FILED AUG. 24, 1915.

1,247,829.

Patented Nov. 27, 1917.
6 SHEETS—SHEET 4.

W. S. HARLEY.
TRANSMISSION GEAR.
APPLICATION FILED AUG. 24, 1915.

1,247,829.

Patented Nov. 27, 1917.
6 SHEETS—SHEET 5.

Witnesses:

Inventor:
William S. Harley
By
Attorneys.

W. S. HARLEY.
TRANSMISSION GEAR.
APPLICATION FILED AUG. 24, 1915.
1,247,829.
Patented Nov. 27, 1917.
6 SHEETS—SHEET 6.
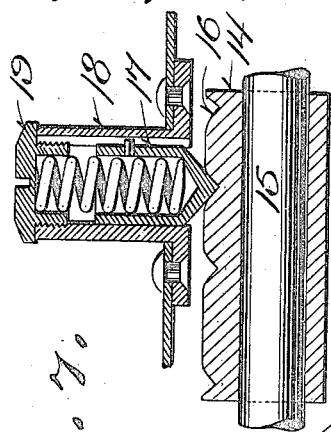
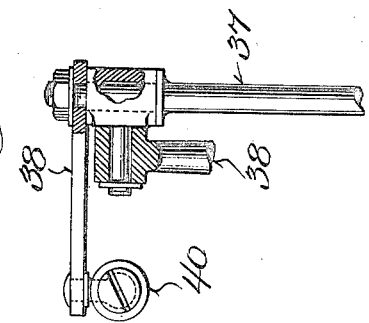
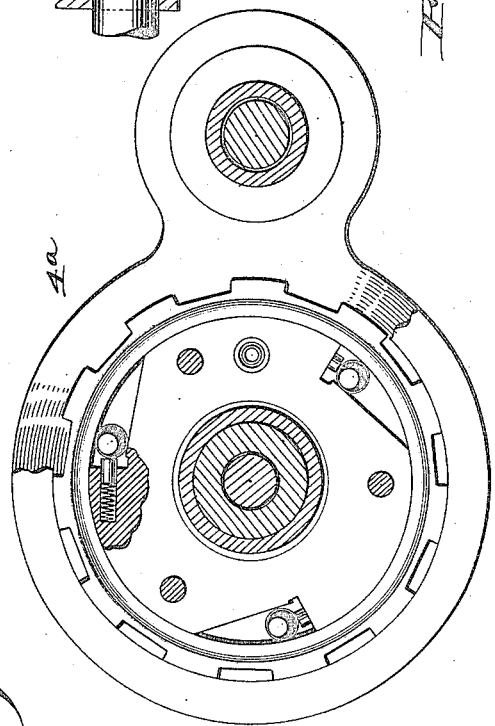
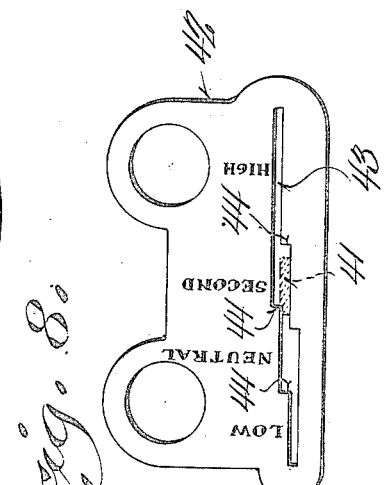

UNITED STATES PATENT OFFICE.

WILLIAM S. HARLEY, OF MILWAUKEE, WISCONSIN, ASSIGNOR TO THE HARLEY-DAVIDSON MOTOR CO., OF MILWAUKEE, WISCONSIN.

TRANSMISSION-GEAR.

1,247,829.   Specification of Letters Patent.   Patented Nov. 27, 1917.

Application filed August 24, 1915. Serial No. 47,036.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Transmission-Gear; and I do hereby declare that the following is a full, clear, and exact description thereof.

This invention relates to the subject of gear transmission especially adapted for use in connection with the gear transmissions of motor vehicles, and the primary aim of the invention is to provide simple and practical means whereby the danger of stripping gears incidental to speed changing is eliminated.

Another object of the invention is to simplify the general assemblage of the gear transmission and the controlling means therefor and to arrange the same in compact form to adapt the invention for use in connection with motor-cycles, the controlling means including a hand operated lever that is disposed within easy reach of the operator and is used as a gear shifter for regulating the speed of the machine, the said controlling means also including a foot operated lever that is disposed within easy reach of the foot of the operator and is used for actuating the clutches and also for simultaneously operating a locking device that prevents the gears being shifted before the clutches are released. By this coöperation of the two mechanisms, it is first necessary to release the clutches and the locking device before the gears can be shifted, this arrangement of parts obviously preventing stripping of the gears.

One simple and thoroughly practical embodiment of the invention is shown in the accompanying drawings, wherein—

Fig. 6 is a sectional view taken on the line 6—6, Fig. 2.

Fig. 7 is a sectional view taken on the lines 7—7, Figs. 3 and 5.

Fig. 8 is a detail view of a combined guide and indicator plate used in connection with the hand lever that shifts the gears.

Fig. 9 is a sectional view taken on the line 9—9, Fig. 1.

Figure 1:
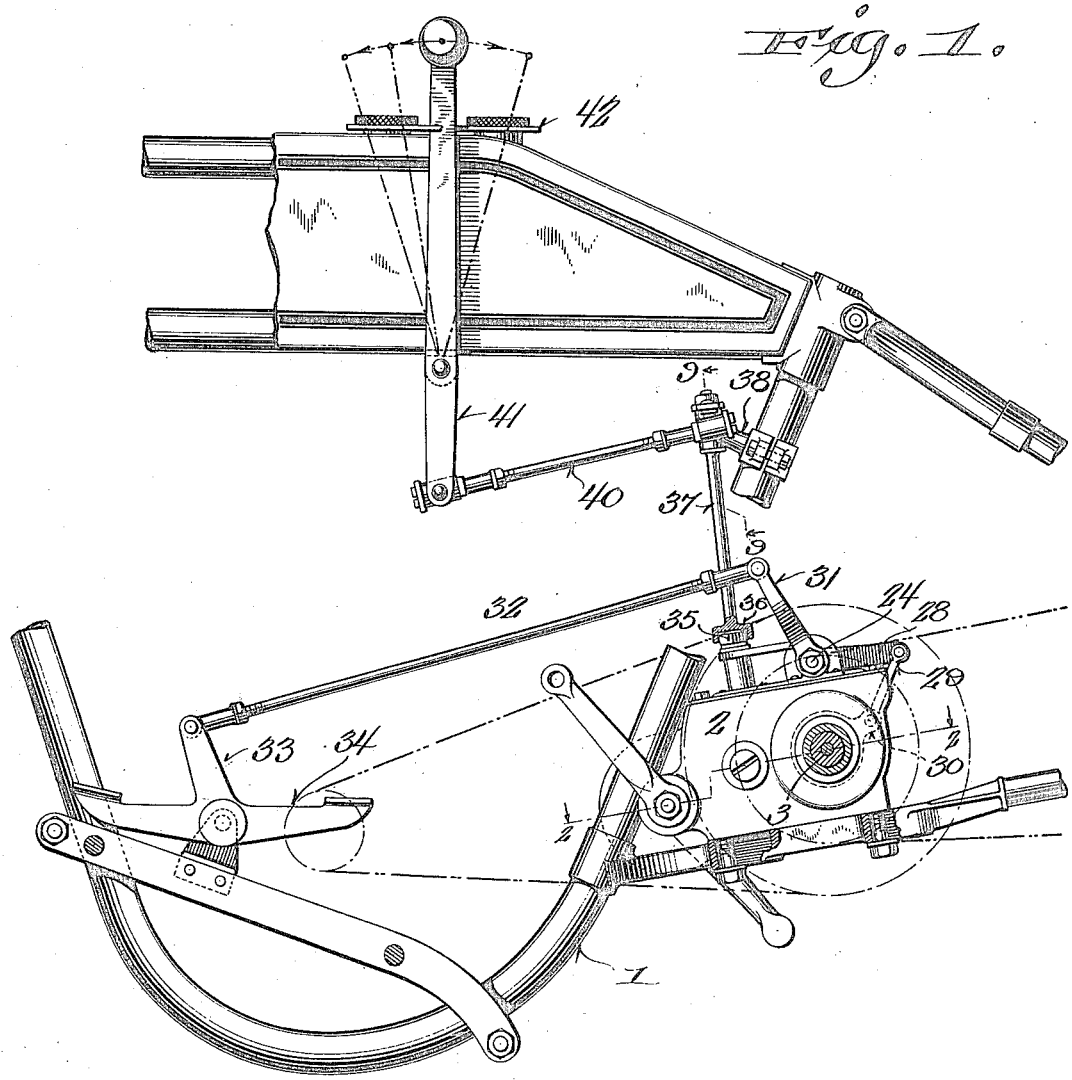
Figure 1 is a fragmentary view in side elevation of the frame of a motor-cycle equipped with the improved gear transmission.
Figure 2:
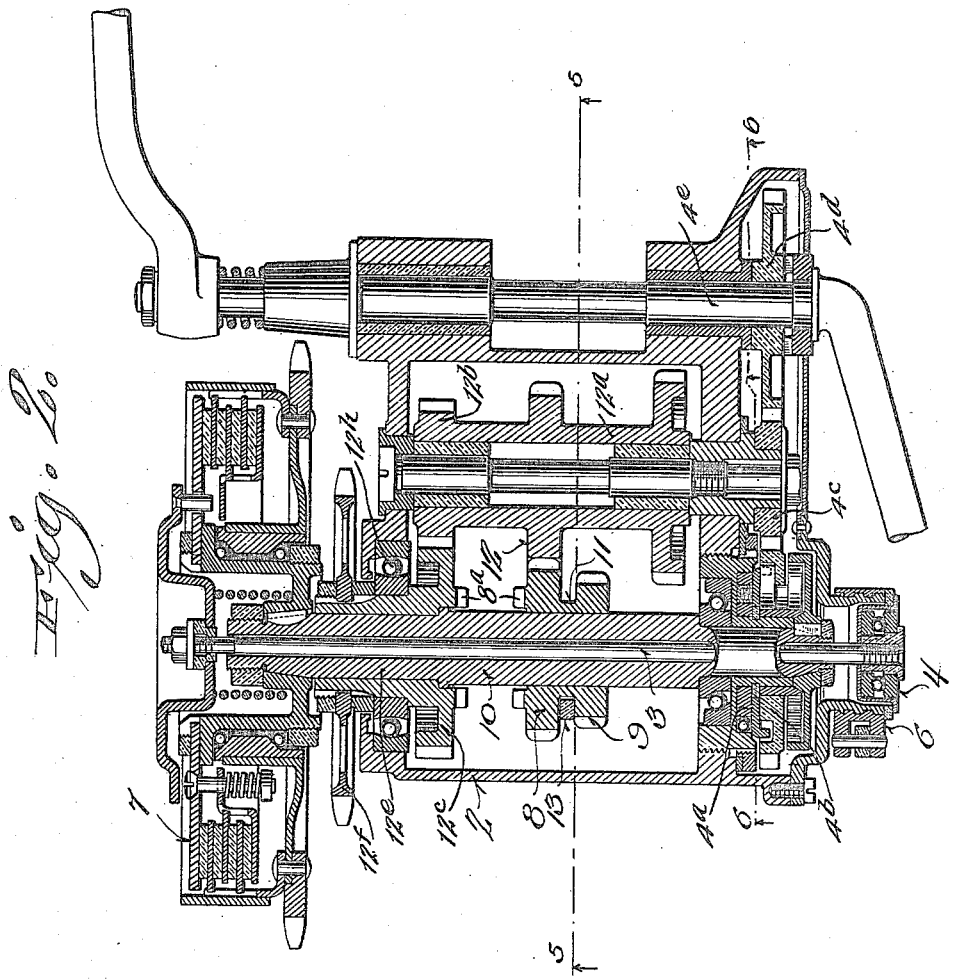
Fig. 2 is a sectional view taken on the line 2—2, Fig. 1.

Referring to the accompanying drawings wherein the improved gear transmission is shown applied to a motor-cycle, 1 designates the frame of the motor-cycle having the transmission casing or box 2 suitably connected to the lower portion thereof. A clutch rod 3 extends through and projects beyond the ends of the box 2, said box 2 having an outwardly projecting housing at one end for inclosing a rotatable head 4 mounted on the rod 3, this head being engageable by a nut 6 that is threaded on the exterior of the housing, the outward movement of the nut 6 serving to slide the rod 3 longitudinally, and thereby actuate the friction clutch 7 that is mounted on the opposite end of rod 3. Mounted on a hollow shaft 10 journaled in the casing and through which the rod 3 projects is a clutch $4^a$ including a gear $4^b$ meshing with an idle gear $4^c$ which in turn meshes with a gear $4^d$ on a pedal shaft $4^e$ to procure a starting actuation of the motor through the transmission mechanism. The clutches $4^a$ and 7 are not described in detail as the details thereof form no essential part of this invention, and so far as this invention is concerned the types of clutches employed may be as shown in the drawings, or any preferred or convenient type.

Figure 3:
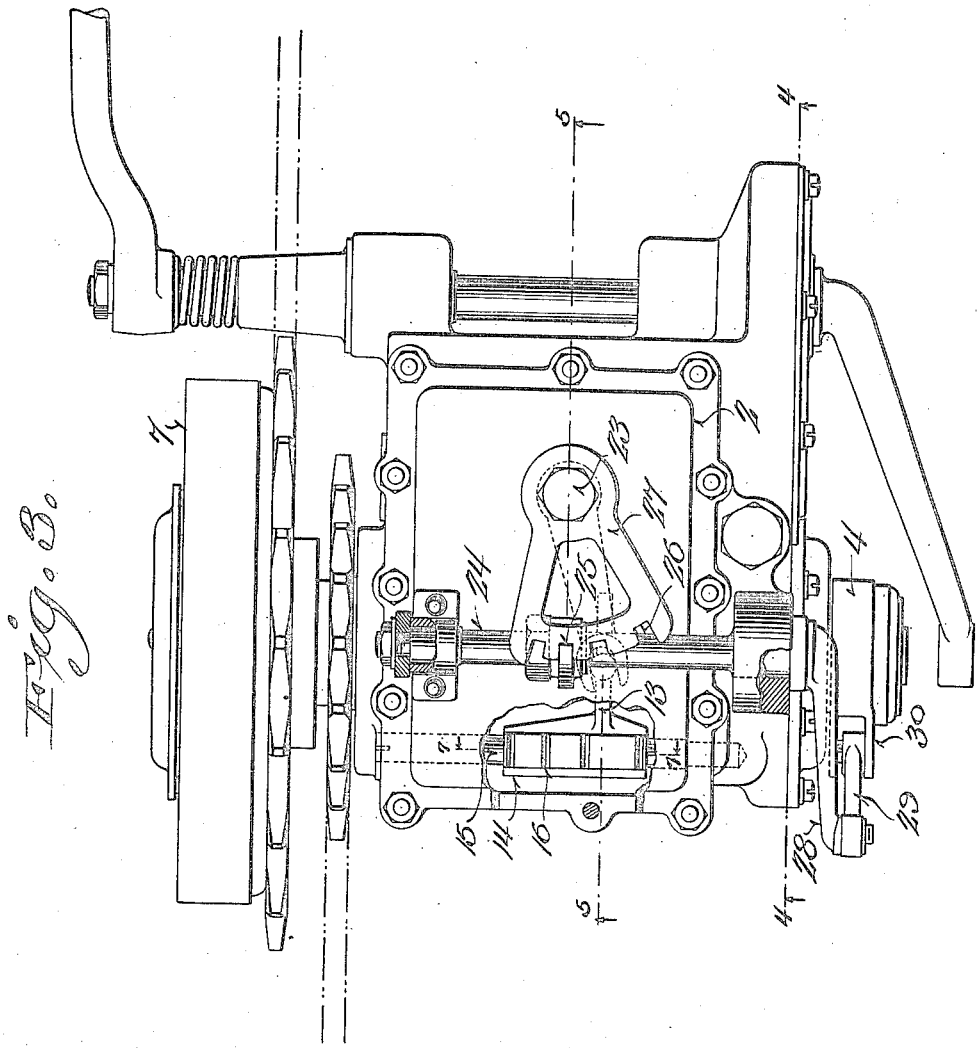
Fig. 3 is a top plan view, partly broken away.
Figure 4:
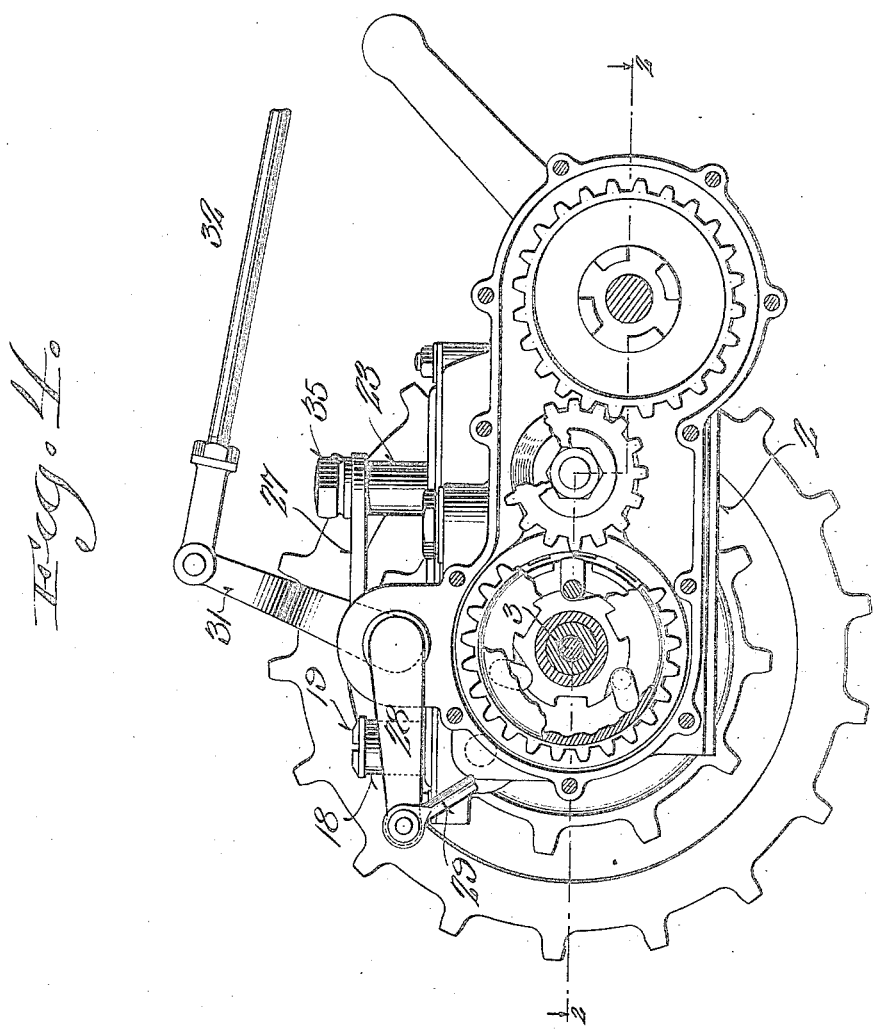
Fig. 4 is a sectional view taken on the line 4—4, Fig. 3.
Figure 5:
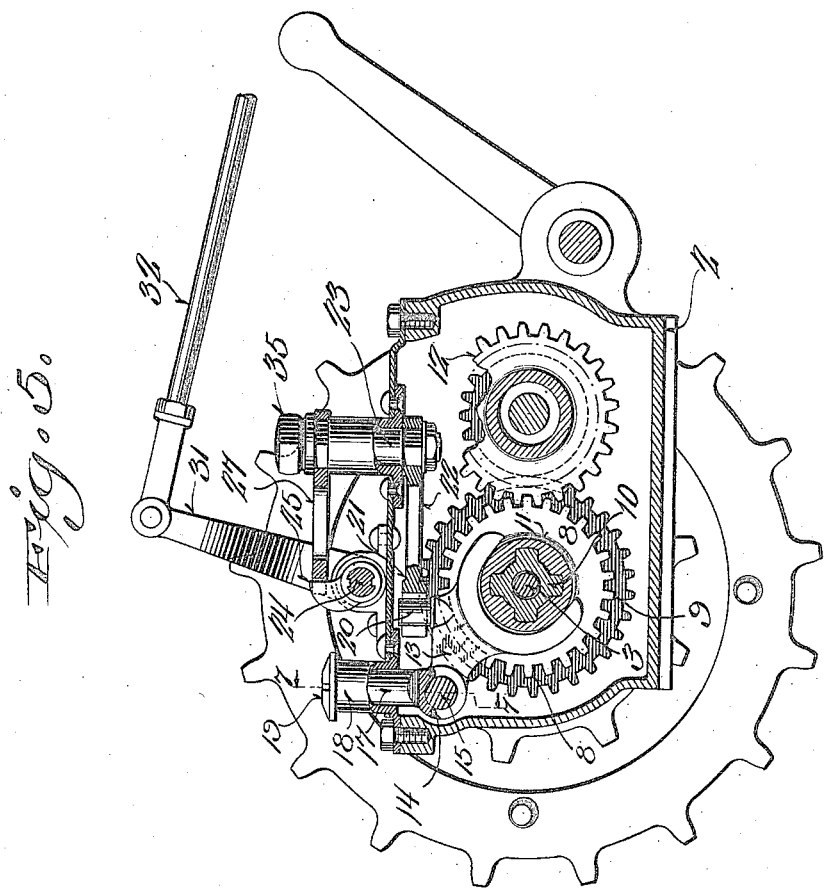
Fig. 5 is a sectional view taken on line 5—5, Fig. 3.

The transmission gearing includes the shiftable gears 8 and 9 slidably mounted on the shaft 10, said shiftable gears 8 and 9 being separated by a groove 11 and adapted to be selectively engaged with the fixed gears 12, as is usual. These fixed gears are carried on a sleeve shaft $12^a$ which has also fixed thereon a gear $12^b$ meshing with a relatively large gear $12^c$ carried on a sleeve $12^e$ which is rotatably mounted on the sleeve 10 and extends through the wall of the box 2 and carries a sprocket wheel $12^f$ adapted to be driven from the engine of the motor-cycle, and disposed between the box 2 and the clutch 7, the wall of the box carrying a suitable ball bearing 12$^h$ for the sleeve 12$^e$. The gears 8 and 9 are shifted by means of the fork 13 that engages the groove 11, the fork projecting from a sleeve 14 that is slidable on a guide rod 15 within the box 2. The shiftable gear 8 and the gear 12$^c$ carry clutch lugs 8$^a$ on their adjacent faces, whereby the sleeve 10 may be driven directly from the drive sleeve 12$^e$. The upper surface of the sleeve 14 is provided with ratchet teeth 16 (see Fig. 7) that are engaged by the spring-pressed plunger 17 that is slidably mounted in a housing 18 suitably fastened to the top of the box 2. The housing 18 is sealed by means of a threaded cap 19 against which the spring bears, said cap also serving to adjust the tension of the spring, as will be apparent. The plunger 17 engages the teeth 16 with sufficient pressure to prevent accidental sliding movement of the sleeve 14, but does not prevent said sleeve being moved by the gear shifting lever, to be described. A lug or pin 20 projects outward from the fork 13, said lug or pin being engaged by the bifurcated end 21 of a crank 22 projecting laterally from the inner end of a stub-shaft 23 mounted on the top of the box 2, (see Fig. 5). Shaft 23 projects above the top of box 2. A rocker shaft 24 extends across the top of box 2, it being mounted in suitable journal bearings carried by the box, and is provided with a laterally projecting locking finger 25 adapted to be engaged selectively with the ratchet notches 26 formed in the curved outer edge of a crank plate 27 fast on the projecting upper end of the stub shaft 23, (see Fig. 3). Shaft 24 carries an end crank 28 which is connected to a crank 30 projecting from the clutch head operating nut 6 by a link 29.

From the foregoing description it will be seen that shaft 24 controls the action of the gear shifter 13, that is, when locking finger 25 of said shaft is engaged with the notches 26 of crank plate 27, shaft 23 can not be rotated hence crank 22, by its engagement with pin 20 of fork 13 prevents said fork shifting the gears 7 and 8. To release such parts, shaft 24 is rotated to disengage finger 25 from crank plate 27 whereupon shaft 23 is free to be operated, as will be described later. Shaft 24 when rotated, in addition to operating the described locking device for the gear shifter, also through crank 28, link 29 and crank 30, operates nut 6 of clutch 4 and through rod 3, operates clutch 7. Therefore, it will be apparent that clutch 7 as well as the locking device for the gear shifter is controlled by the operations of shaft 24. Shaft 24 is operated by means of an end crank 31 that has an adjustable rod connection 32 with a crank 33 projecting from a treadle 34 that is suitably pivoted to the lower, forward portion of the frame 1 of the machine. The treadle is preferably one provided with two treads, and when rocked in one direction releases the locking device and clutches, and when rocked in an opposite direction causes the locking device to lock the shifter and engage the clutch sections.

Shaft 23 has a nut-shaped head 35 that is engaged by a similarly shaped cap 36 at the lower end of a rod 37, the rod 37 having its upper end journaled in a bracket 38 clipped or otherwise attached to the upper portion of the frame 1. The upper portion of rod 37 is provided with a crank 39 having an adjustable link connection 40 pivoted to the lower end of a hand lever 41, said lever being pivotally connected to one of the upper bars of the frame 1 and working in a guide plate 42 carried by the upper portion of the frame 1. The guide plate 42, as shown in Fig. 8 is provided with a slot 43 marked to indicate speed positions of the lever 41 and being also provided with stepped notches 44 forming seats for the said lever.

From the foregoing description it will be apparent that the present invention provides simple means whereby the shifting of the gears 8 and 9 by the lever 41 can not be performed until the treadle 34 has been manipulated to release the locking device and the clutch 7, and by means of the same, the danger of gear-stripping is eliminated.

I claim as my invention:—

1. A motorcycle gear transmission comprising a gear casing, a shaft journaled in the casing and projecting outwardly thereof, a clutch on the projected end of the shaft, a gear, a variable speed connection between said gear and shaft including a member splined on the shaft, means for shifting said member including a second shaft journaled transversely of the first shaft, means connected with the clutch for actuating the same including a rock arm, a third shaft journaled longitudinally of the first shaft, a rock arm on said third shaft, a link connecting said rock arms, and means for procuring an interlocking relation of the clutch control and the gear shaft comprising a notched plate on the second shaft and a locking arm on the third shaft engageable therewith.

2. A motorcycle gear transmission including a gear casing, a shaft journaled in the casing and projecting outwardly thereof, a clutch on the projected end of the shaft, a gear, a variable speed connection between said gear and the shaft including a member splined on the shaft, means for shifting said member including, a second shaft journaled transversely of the first shaft, a rod extending longitudinally through the first shaft and connected with the clutch thereof, means for actuating said rod including a member having a cam connected with the casing and engageable with the rod, a third shaft journaled longitudinally of the first shaft, rock arms on said third shaft and the cam member, a link connecting said rock arms, and means for procuring an interlocking relation of the clutch control and the gear shaft, comprising a notched plate on the second shaft and a locking arm on the third shaft engageable therewith.

In testimony that I claim the foregoing I have hereunto set my hand at Milwaukee, in the county of Milwaukee, and State of Wisconsin, in the presence of two witnesses.

WILLIAM S. HARLEY.

Witnesses:
   EDWIN F. CASPER,
   JOS. G. KILBERT.